(12) United States Patent
Lee

(10) Patent No.: US 9,524,503 B2
(45) Date of Patent: Dec. 20, 2016

(54) METHOD AND SYSTEM FOR EXPOSING GAMES

(75) Inventor: Dong-soo Lee, Gyeonggi-do (KR)

(73) Assignee: NHN Entertainment Corporation, Seongnam-si (KR)

( * ) Notice: Subject to any disclaimer, the term of this patent is extended or adjusted under 35 U.S.C. 154(b) by 999 days.

(21) Appl. No.: 12/279,338

(22) PCT Filed: Feb. 9, 2007

(86) PCT No.: PCT/KR2007/000719
§ 371 (c)(1),
(2), (4) Date: Aug. 13, 2008

(87) PCT Pub. No.: WO2007/094587
PCT Pub. Date: Aug. 23, 2007

(65) Prior Publication Data
US 2009/0019349 A1 Jan. 15, 2009

(30) Foreign Application Priority Data
Feb. 15, 2006 (KR) .......................... 10-2006-0014841

(51) Int. Cl.
*G06F 17/20* (2006.01)
*G06Q 30/02* (2012.01)

(52) U.S. Cl.
CPC .................... *G06Q 30/02* (2013.01)

(58) Field of Classification Search
CPC ... G06F 9/542; G06F 9/45504; G06F 9/45529
USPC ................................................. 715/205, 760
See application file for complete search history.

(56) References Cited

U.S. PATENT DOCUMENTS

| 7,546,534 | B1* | 6/2009 | Andrews et al. ............ 715/747 |
| 2002/0023101 | A1* | 2/2002 | Kurihara et al. ............ 707/205 |
| 2002/0165026 | A1* | 11/2002 | Perkins et al. ............... 463/42 |
| 2005/0119936 | A1* | 6/2005 | Buchanan et al. ............ 705/14 |
| 2005/0144251 | A1* | 6/2005 | Slate .......................... 709/215 |
| 2005/0171961 | A1* | 8/2005 | Culbreth ............... G06F 9/4443 |

(Continued)

FOREIGN PATENT DOCUMENTS

| JP | 10-171703 | 6/1998 |
| JP | 2000-348052 | 12/2000 |

(Continued)

OTHER PUBLICATIONS

Matsuhara Ton, "New OS Strategy of MS—Project for Modifying Windows to Internet OS," Nikei Byte, Apr. 22, 1996, No. 151, pp. 172-180.

(Continued)

*Primary Examiner* — Ajay Bhatia
*Assistant Examiner* — Haimei Jiang
(74) *Attorney, Agent, or Firm* — H.C. Park & Associates, PLC

(57) ABSTRACT

A game exposing method and system is provided. The game exposing method includes displaying a game web site in a first folder of a file manager application of a user terminal; and displaying a game provided from the game web site in a second folder of the file manager application. Accordingly, it is possible to easily access the game portal web site and the game pages to play the games while operating in the file manager application.

20 Claims, 5 Drawing Sheets

(56) References Cited

U.S. PATENT DOCUMENTS

| | | | |
|---|---|---|---|
| 2006/0041830 A1* | 2/2006 | Bohn | G06F 17/30864 |
| | | | 715/202 |
| 2006/0059441 A1* | 3/2006 | Todd | 715/853 |
| 2006/0224602 A1* | 10/2006 | Rawat et al. | 707/100 |
| 2007/0050386 A1* | 3/2007 | Busey | G06F 17/30067 |
| 2007/0160964 A1* | 7/2007 | Albertsson | G06Q 10/105 |
| | | | 434/219 |
| 2009/0249210 A1* | 10/2009 | Sheldon et al. | 715/730 |
| 2010/0184512 A1* | 7/2010 | Evans et al. | 463/31 |

FOREIGN PATENT DOCUMENTS

| | | |
|---|---|---|
| JP | 2005-058612 | 3/2005 |
| KR | 10-2000-0018097 | 4/2000 |
| KR | 10-2001-0001954 | 1/2001 |
| KR | 10-2003-0060490 | 7/2003 |
| KR | 10-2003-0086549 | 11/2003 |
| KR | 10-2004-0048495 | 6/2004 |

OTHER PUBLICATIONS

NetRecorder3, DOS/V Power Report, Mar. 1, 1998, vol. 8, No. 3, p. 148.

* cited by examiner

METHOD AND SYSTEM FOR EXPOSING GAMES

CROSS-REFERENCE TO RELATED APPLICATION

This application is a U.S. National Phase Application of International Application PCT Application No. PCT/KR2007/000719 filed on Feb. 9, 2007, which claims the benefit of priority from Korean Patent Application No. 10-2006-0014841 filed on Feb. 15, 2006. The disclosures of International Application PCT Application No. PCT/KR2007/000719 and Korean Patent Application No. 10-2006-0014841 are incorporated herein by reference.

TECHNICAL FIELD

The present invention relates to a game exposing method and system.

BACKGROUND ART

With advance of computers and prevalence of the high-speed Internet, on-line games enabling on-line users to enjoy games in real time show rapid growth. To enjoy the on-line game with other users, a user installs a game program to a hard disc drive of the user terminal and access to an external server over the Internet.

There are various methods to execute the on-line game using the user terminal by the user, including a method of opening a web browser, accessing a game web site of the corresponding on-line game, and then clicking the corresponding on-line game with a mouse, a method of searching and executing the corresponding on-line game in a program list through a start menu of Microsoft Windows® (hereinafter referred to as "Windows" or "Microsoft Windows"), a method of clicking the corresponding game icon on a computer screen when the icon of the corresponding on-line game is displayed on the computer screen of Windows, and a method of searching a folder where the corresponding on-line game is installed using a file manager application, such as Windows Explorer®, and clicking the on-line game EXE file in the folder.

Thus, to execute the game, the user needs to pass through several steps and to manipulate mouse and keyboard many times.

DISCLOSURE

Technical Problem

An aspect of the present invention has been provided to solve the above-mentioned and/or other problems and disadvantages and an aspect of the present invention provides a game exposing method and system enabling a user to easily execute a game.

Technical Solution

According to an aspect of the present invention, a game exposing method includes graphically displaying a game web site as a first folder of a file manager application in a user terminal; and displaying a game provided from the game web site as a second folder of the file manager application.

The displaying the game may include checking whether the game has been installed in the user terminal; and displaying the game as the second folder in case that the game has been installed in the user terminal.

The displaying the game may include displaying the game as the second folder if the game is installed in the user terminal.

The second folder may be a game identifier included in the first folder.

A web page of the game web site may be displayed in a content pane of the file manager application when the first folder is selected, and a web page of the game may be displayed in a content pane of the file manager application when the second folder is selected.

A web page of the game web site may be displayed in a content pane of the file manager application when the first folder is selected, and the game may be executed when the second folder is selected.

The second folder would be deleted from the window 300 if the game is uninstalled from the user terminal.

The first and second folders may be displayed together with first and second graphical icons respectively.

Information as to the game web site or information as to the game may be displayed in at least one of a title bar, a menu, a tool bar, and a status bar of the file manager application.

According to another aspect of the present invention, a web site exposing method includes displaying a predetermined web site in a first folder of a file manager application; displaying a hypertext link provided from the predetermined web site in a second folder which is a game identifier included in the first folder; displaying the predetermined web site in a content pane of the file manager application when the first folder is selected; and displaying a web page corresponding to the hypertext link in the content pane of the file manager application when the second folder is selected.

According to further aspect of the present invention, a computer-readable medium contains a program to execute one of the above methods in a computer.

According to further aspect of the present invention, a game exposing system includes a first server which transmits a game exposing program to a user terminal and installs the game exposing program to the user terminal, wherein the game exposing program displays a game web site in a first folder of an file manager application of the user terminal and displays a game provided from the game web site in a second folder of the file manager application.

The game exposing program may display the game in the second folder in case that the game has been installed in the user terminal by checking whether the game has been installed in the user terminal.

The game exposing program might display the game identifier as the second folder if the game is installed in the user terminal.

The second folder may be a game identifier included in the first folder.

The game exposing system may further include a second sever which transmits web page information of the game web site to the user terminal to display a web page of the game web site in a content pane of the file manager application when the first folder is selected and to display a web page of the game in the content pane of the file manager application when the second folder is selected.

The game exposing system may further include a second server which transmits web page information of the game web site to the user terminal to display a web page of the game web site in a content pane of the file manager application when the first folder is selected; and a third server which communications with the user terminal to play the game when the second folder is selected.

The game exposing system might delete the second folder from the file manager application if the game is uninstalled from the user terminal.

The game exposing program may display the first and second folders together with first and second icons respectively.

The game exposing program may display information as to the game web site or information as to the game in at least one of a title bar, a menu, a tool bar, and a status bar of the file manager application.

Advantageous Effects

Accordingly, by displaying the game portal web site and the game names as folders in the window which is frequently used at the computer, it is possible to easily access the game portal web site and the game pages and easily execute the corresponding game program while operating in the file manager application. Besides the web page, the advertisement and game related information of the game portal web site can be exposed to inform the services provided from the game portal and utilize them for the advertising.

MODE FOR INVENTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention.

Figure 1:
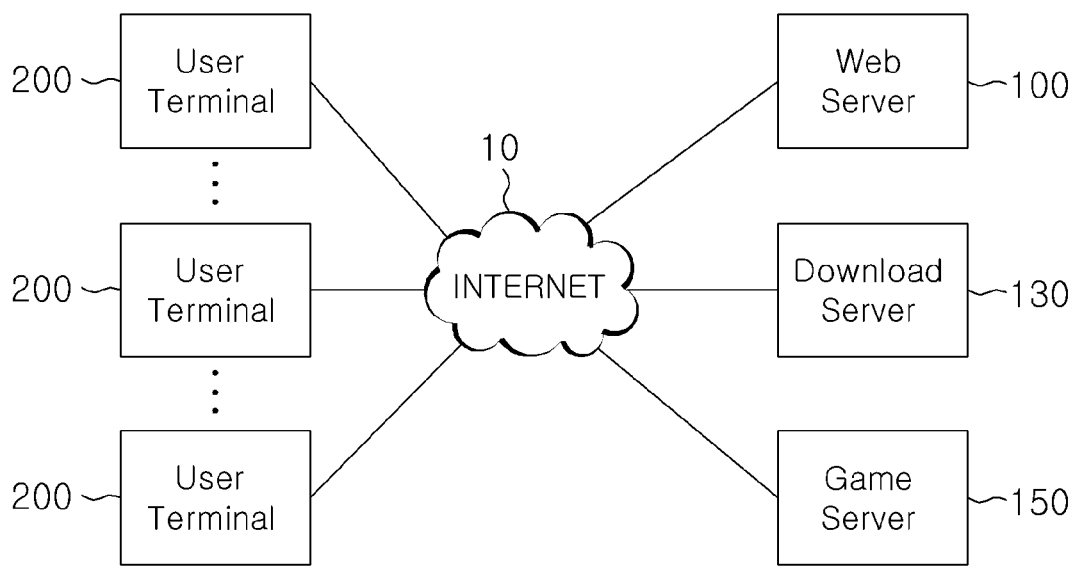
FIG. 1 is a block diagram of a game exposing system according to an embodiment of the present invention.
Figure 2:
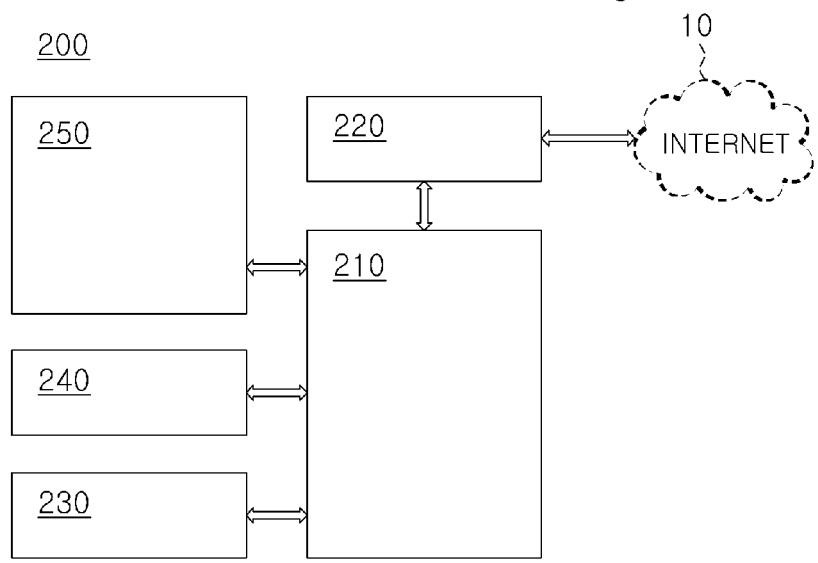
FIG. 2 is a block diagram of a user terminal of the game exposing system according to an embodiment of the present invention.

Initially referring to FIGS. 1 and 2, a game exposing system according to an embodiment of the present invention is described in detail.

FIG. 1 is a block diagram of the game exposing system according to an embodiment of the present invention, and FIG. 2 is a block diagram of a user terminal of the game exposing system according to an embodiment of the present invention.

In FIG. 1, the game exposing system includes a web server 100, a download server 130, and a game server 150. The servers 100, 130, and 150 are connected to a plurality of user terminals 200 over Internet 10.

The web server 100 serves a game portal web site to the user terminals 200 and authenticates a user who accesses the web server 100 through the game portal web site. The game portal web site arranges a variety of games provided from a game provider and enables to execute a game by accessing a web page of the game and executing the game according to the user's choice.

The download server 130 transmits a game exposing program and a game program to the user terminal 200 and installs the game exposing program and the game program to the user terminal 200. If the programs are of old version, the download server 130 would update the programs by transmitting new version programs.

The game server 150 enables the user to play the game by transmitting and receiving game related data to and from the user terminal 200. That is, the game server 150 progresses the game according to a game logic and game setting information by referring to a database (not shown).

While the download server 130 transmits the game exposing program to the user terminal 200, the web server 100 or the game server 150 can transmit and install the game exposing program to the user terminal 200.

As shown in FIG. 2, the user terminal 200 includes a communication part 220 which communicates with the web server 100, the download server 130, and the game server 150 over the Internet 10, a storage 230 which stores the game exposing program downloaded from the download server 130, a registry 240 which contains information relating to configuration setting and system information of the user terminal 200, a display part 250, and a controller 210 which controls the components. The controller 210 operates according to an operating system, such as Microsoft Windows®. For example, the controller 210 exposes the game to the user terminal 200 using the Windows Explorer® (hereafter, referred to as Explorer). The Explorer, which is one of the most frequently used file manager application in the Windows® operating system, generally serves to gather several objects constituting the system, such as folder, printer, network objects, to communicate with the objects, and to display the object contents in the window using the hierarchical structure.

The user terminal 200 can be implemented using a device capable of communicating data by accessing to the Internet 10 by wire or wireless, such as desktop computer, notebook computer, workstation, palmtop computer, personal digital assistant (PDA), web pad, and mobile terminal.

The Internet 10 can be wired or wireless and may adopt any transmission scheme.

Now, detailed descriptions are provided on the installation of the game exposing program to the user terminal 200.

First, when the user accesses the game portal web site through the web browser of the user terminal 200 and inputs user ID and password, the web server 100 performs the user authentication. Next, the web server 100 examines whether the game exposing program is installed or not and rejected or not by reading cookies of the user terminal 200. If the game exposing program is not installed in the user terminal 200 and its installation is not rejected, the web server 100 would inquire of the user about whether to install the game exposing program. Herein, the user authentication is not necessarily required and the web server 100 may inquire about whether to install the game exposing program without the user authentication. If the game exposing program is installed or its installation is rejected, the web server 100 would not inquire about whether to install the game exposing program.

If the user rejects the installation in response to the inquiry of the web sever 100, this would be recorded to the cookies and referred to at the next access. If the user approves the installation, the download server 130 would download the game exposing program to the user terminal 200.

Upon the completion of the downloading, the game exposing program is executed in the user terminal 200. The game exposing program includes a dynamic linking library (DLL) file called "HgExplorer.dll" by way of example. As the game exposing program is executed, "HgExplorer.dll" file is stored to the storage 230 and registered to the registry 240. "HgExplorer.dll" functions to display the game program installed in the user terminal 200 onto the file manager application.

Meanwhile, the web server 100 puts up the game exposing program in the game portal web site separately or in a normal download board so that the user can download and install the game program all the time. Also, the web server 100 can put up only the "HgExplorer.dll" file to be downloaded by the user, and the user can manually register the "HgExplorer.dll" file to the registry 240 of the user terminal 200 using utility regsrv32.exe. The game exposing program does not need to necessarily include the DLL format file, and any file functioning similar to "HgExplorer.dll" file is allowable.

By contrast, in stead of downloading and installing the game exposing program from the download server 130 over the Internet 10, the game exposing program can be installed using a storage medium such as a compact disk (CD) or a digital versatile disk (DVD). For instance, when installing the game program using a storage medium as in the PC game, the game exposing program is contained in the storage medium together with the game program so as to install the game program to the user terminal 200 together with the game exposing program.

If installing the game exposing program regardless of the game program installed in the user terminal 200, the user might select the game program in the game portal web site and display the selected game program in the file manager application.

Upon executing the file manager application, the controller 210 executes "HgExplorer.dll" file registered to the registry 240. Accordingly, the controller 210 inspects the game program installed in the user terminal 200 among the game programs arranged in the game portal web site by referring to the registry 240. Next, the name of the game portal web site is created as a folder and the game names installed in the user terminal 200 are created as game identifiers of the folder. Finally, the controller 210 opens the window in the display part 250 and displays the folder and the game identifiers in the window. In general, it is known that double-click of the Explorer icon opens the window and executes the Explorer. Yet, in practice, the Explorer is being executed all the time from the system booting to the power-off and the opening of the window is merely one of processes of the Explorer. However, to ease the understanding, the two concepts will be used together.

Once the game exposing program is installed in the user terminal 200, even when another game program of the game portal web site is installed in the user terminal 200, its information is registered to the registry 240. Hence, the name of the newly installed game program is also displayed in the window. Afterwards, when the game program is removed from the user terminal 220, the removed game is disappeared from the window.

As such, by displaying the names of the game portal web site and the relevant games as the folder structure in the file manager application, the user is exposed to the game during the file manager application operation to ease the access to the game.

Figure 3:
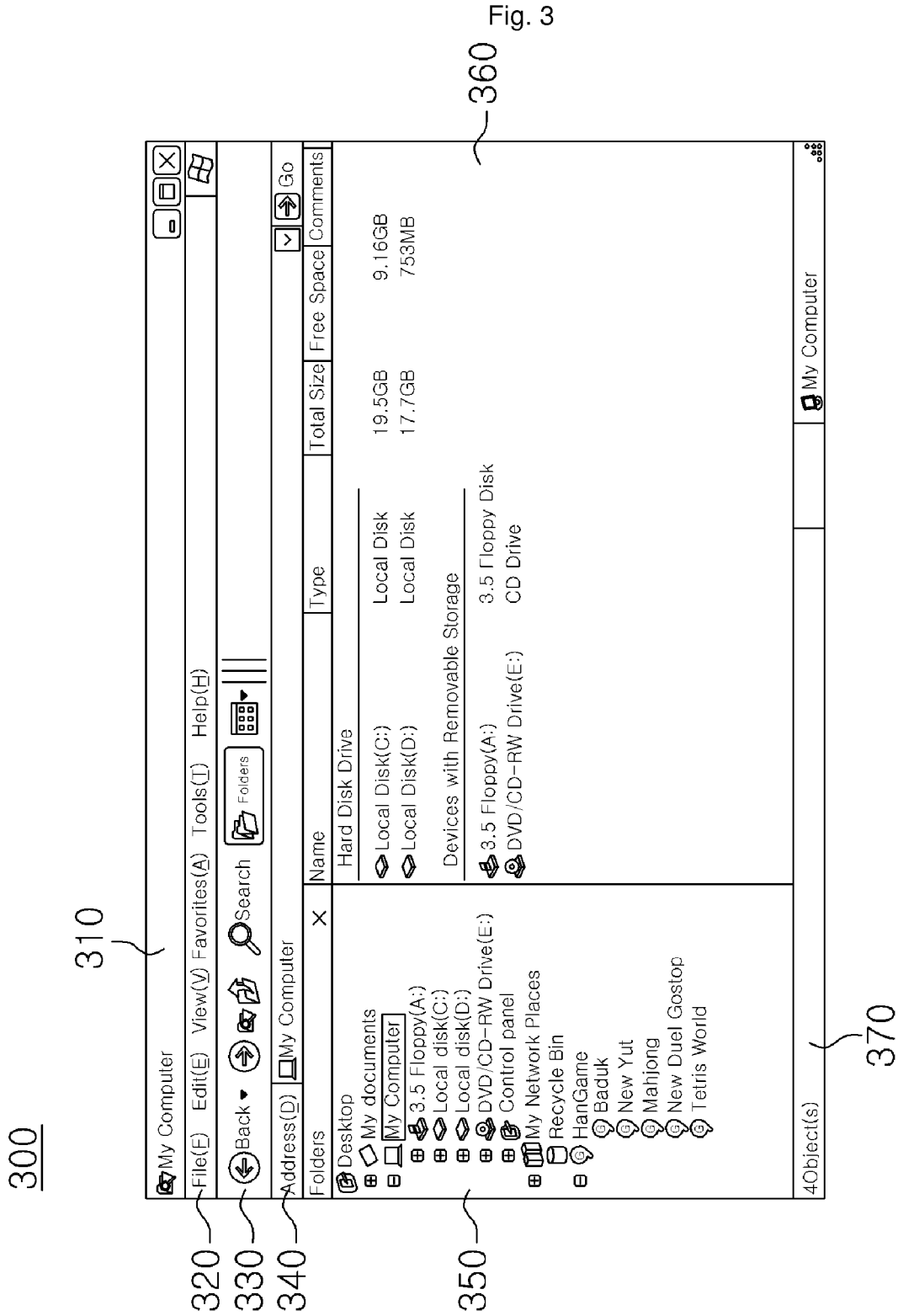
FIG. 3 is a view showing Windows Explorer® captured after the game is displayed in the explorer according to an embodiment of the present invention.
Figure 4:
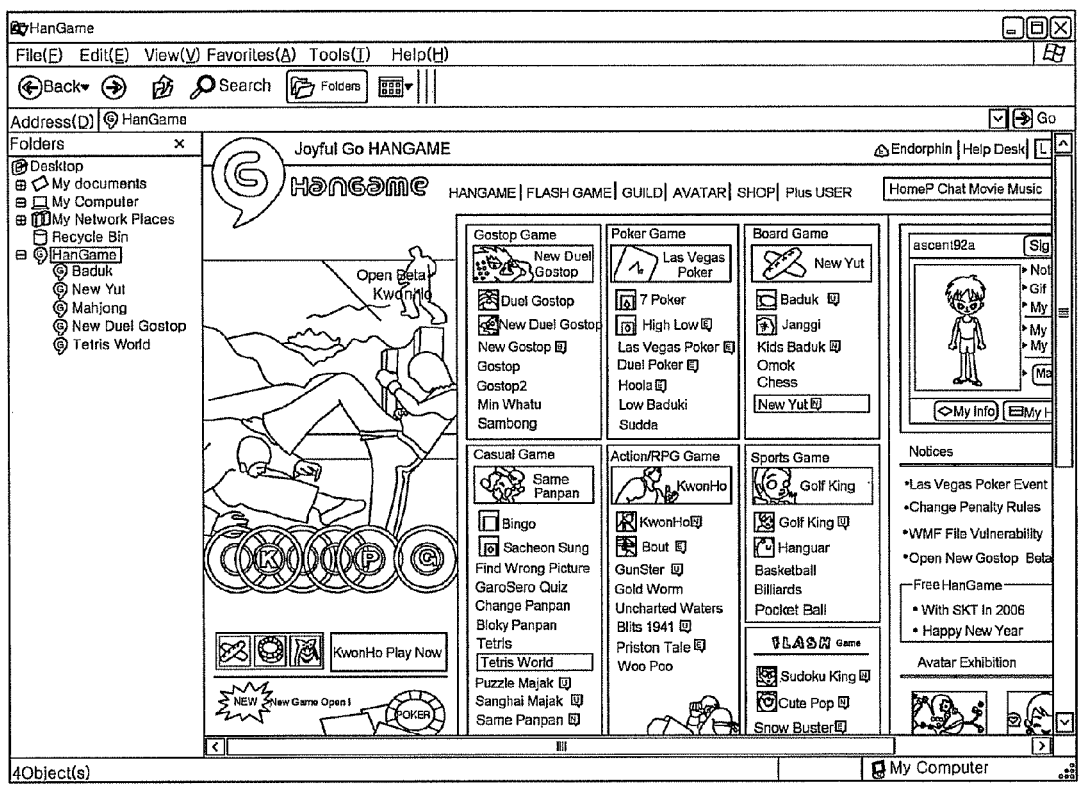
FIG. 4 is a view showing Windows Explorer® captured after the game is displayed in the explorer according to an embodiment of the present invention.
Figure 5:
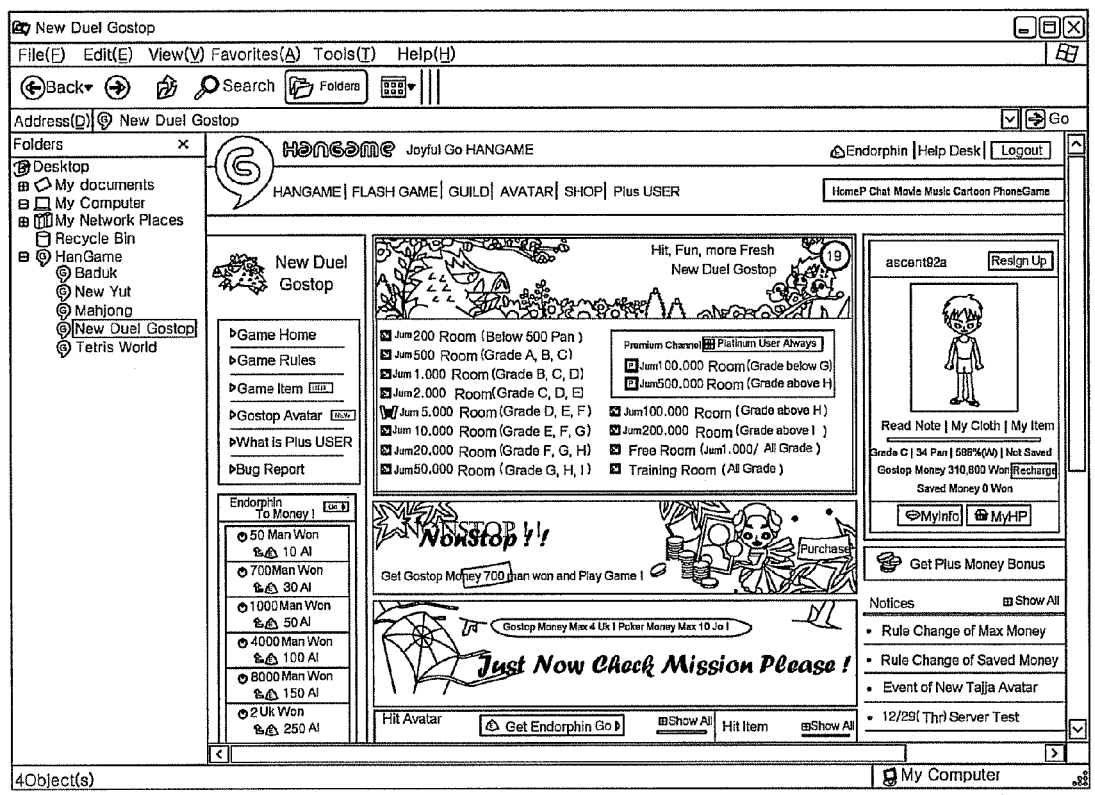
FIG. 5 is a view showing Windows Explorer® captured after the game is displayed in the explorer according to an embodiment of the present invention.

Now, the displaying of the games in the window is described in more detail by referring to FIGS. 3, 4, and 5. Hereafter, a game portal web site "HanGame" is illustrated by way of example.

FIGS. 3, 4 and 5 depict views of the window captured after the games are displayed in the file manager application according to an embodiment of the present invention.

Upon executing the file manager application, the window 300 of FIG. 3 is opened. The window 300 includes a title bar 310, a menu bar 320, a tool bar 330, an address bar 340, a folders pane 350, a content pane 360, and a status bar 370.

The title bar 310 displays a drive or a folder selected at present. In FIG. 3, "My Computer" is selected and displayed. The menu bar 320 displays menus for executing various functions of the file manager application. The tool bar 330 displays tools for activating the menu functions more rapidly and easily. The address bar 340 displays the path of the folder or file being open at present.

The folders pane 350 displays all of drives and programs installed to the system, and folders. "+" and "−" signs on the left of the items displayed in the folders pane 350 shows and hides sub-items of the selected item.

The content pane 360 displays contents of the item selected in the folders pane 350. As shown in FIG. 3, "My Computer" is selected on the folders pane 350 and accordingly, drives and devices in "My Computer" are displayed in the content pane 360. Double-click on the item displayed in the content pane 360 shows its subitems. The item can be a drive, a folder, and a file. The double-click on the folder shows its game identifiers and files. Upon the double-click on the file, a program associated with the file is executed and its file content can be viewed.

The status bar 370 displays the number of the folders and the files contained in the currently selected driver or folder, the remaining disk space, and so forth.

All of the folders displayed in the folders pane 350 have tree structure. As shown in FIG. 3, "Desktop" lies at the top of the folders pane 350 and its subitems include "My Documents", "My Computer", "My Network Places", "Recycle Bin", and "HanGame". Under "My Computer", disks, drives and control panel are displayed as subfolders. Under "HanGame", game names of "Baduk", "New Yut", "Mahjong", "New Duel Gostop" and "Tetris World" are displayed as game identifiers. As such, "HanGame" and the relevant games are displayed in the folders pane 350 of the file manager application because the games and the game exposing program are installed in the user terminal 200.

Since the custom folders have the features of the general folder, the game subfolder can be shown or hidden by selecting "+" or "−" sign on the left of the "HanGame" icon. It is possible to set a context menu for "HanGame" and the game folders and to perform the operations directed by menus such as Delete, Rename, Create Shortcut, and Properties. For instance, a game folder can be deleted by right-clicking a mouse in the folders pane 350 and selecting Delete, or by selecting the game folder and pressing a delete key of the keyboard. Although the game folder is deleted from the folders pane 350, the corresponding game program is not deleted.

Herein, icons at the front of the respective game folders are the same as the "HanGame" icon for convenience. Note that it is possible to change the icons to correspond to the respective games. In this case, better accessibility to the respective games is obtained.

The file manager application supports a web view displaying web pages. Thus, it is possible to display the web page in the content pane 360 in the same manner as the web page displayed in the general web browser. Also, web surfing is feasible, as in the web browser, by navigating from the displayed web page to another page using a hypertext link.

By clicking on the game folder displayed in the folders pane 350, a web page of the corresponding game can be displayed in the content pane 360. That is, as shown in FIG. 4, when "HanGame" is selected in the folders pane 350, the user terminal 200 accesses the web server 100, receives information of the corresponding web page, and displays a main page of the "HanGame" portal web site in the content pane 360 of the file manager application. The main page arranges various games provided by "HanGame" portal according to their types. Likewise, when "New Duel Gostop" is selected in the folders pane 350 as shown in FIG. 5, a web page corresponding to "New Duel Gostop" is displayed in the content pane 360. Of course, even when the hypertext link "New Duel Gostop" displayed in the content pane 360 is clicked while the window 200 is in the state of FIG. 4, the content pane 360 changes to the web page corresponding to the "New Duel Gostop".

When a game start button or a game channel is clicked in the game page displayed in the content pane 360, the game program installed in the user terminal 200 is executed. Accordingly, the user terminal 200 can access to the game server 150 and play the game.

In some cases, when the game folder displayed in the folders pane 350 is selected, the game program can be directly executed and the corresponding game can be played.

When the user selects a game folder while the user authentication is not carried out, a user authentication web page may be opened without accessing to the web page of the corresponding game. By contrast, even when the selection of the game folder is changed while the user authentication is carried out, this state is maintained and the web page of the selected game is displayed in the content pane 360 to play the corresponding game.

The game names and the game menus may be displayed in the menu bar 320, the tool bar 330, or the status bar 370 of the window 300, and game related information such as game version, capacity, and notice may be displayed. In addition, the content pane 360 can show game related information and diverse advertisements without displaying the game page.

While the name of the game portal web site and the game names are displayed in the folders pane 350, for example, logos, nicknames, and abbreviations specifying the game portal web site and the games can be displayed instead of the names. Also, the names of the game portal web site and the games displayed in the folders pane 350 can be changed to user's intended names by "Rename" of the user and then displayed.

In the following, "HgExplorer.dll" file which displays the game folders in the file manager application is explained in further detail by referring to FIG. 6.

Figure 6:
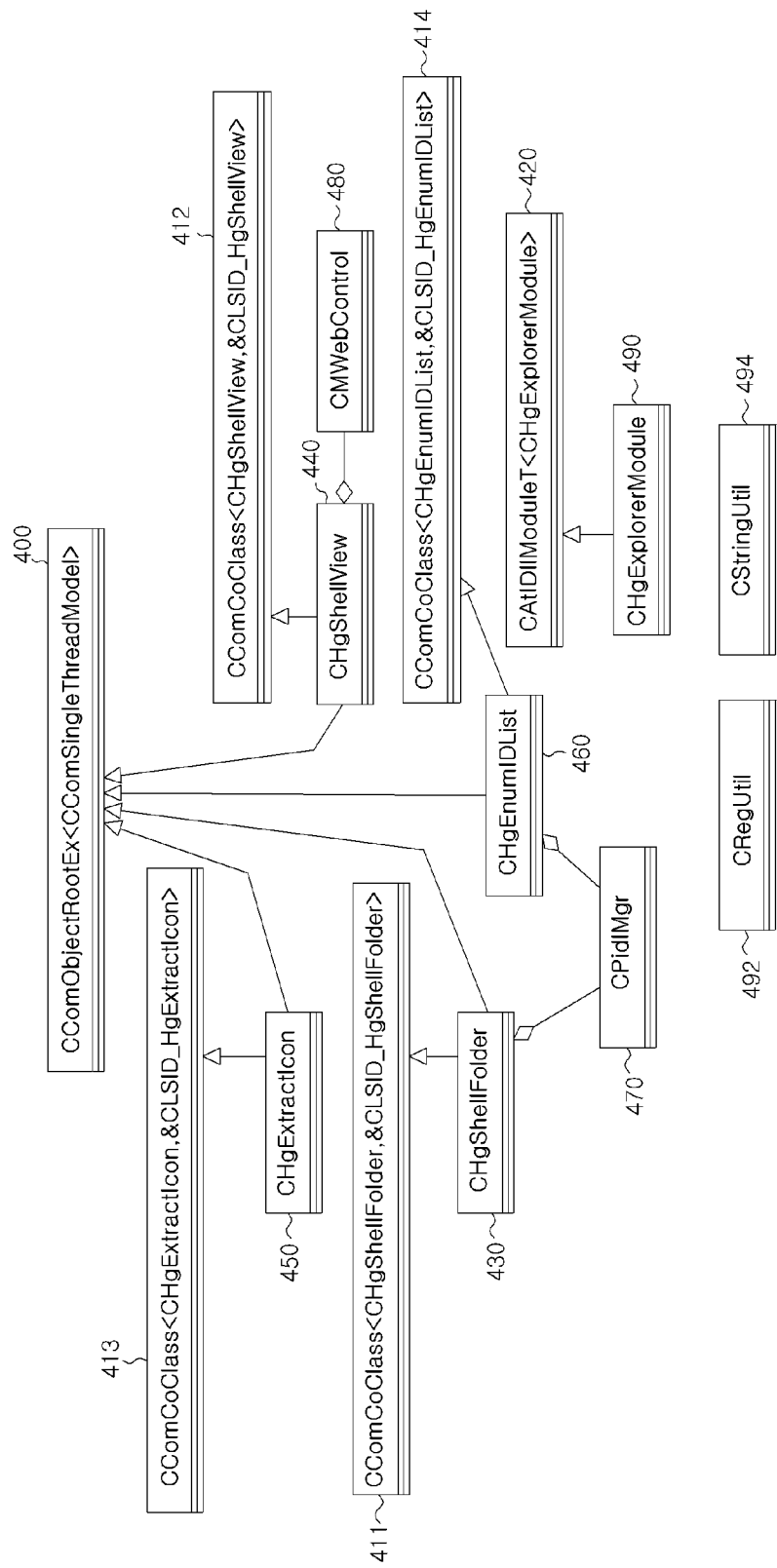
FIG. 6 is a class diagram of a program for displaying the game in the explorer according to an embodiment of the present invention.

FIG. 6 is a class diagram of a program (HgExplorer.dll) for displaying the games in the file manager application according to an embodiment of the present invention.

As shown in FIG. 6, "HgExplorer.dll" includes classes of CComObjectRootEx 400, CComCoClass 411, 412, 413, and 414, CAtldllModuleT 420, CHgShellFolder 430, CHgShellView 440, CHgExtractIcon 450, CHgEnumIDList 460, CPidlMgr 470, CMWebControl 480, CHgExplorerModule 490, CRegUtil 492, and CStringUtil 494.

CComObjectRootEx 400 and CComCoClass 411 through 414, which are basic classes of active template library (ATL), should be included to an inheritance list when applying a component object model (COM) based technology.

CAtldllModuleT 420, which is the class provided from ATL, is used in the DLL application program and provides a code for the standard exports.

CHgShellFolder 430, which is the first class requested by the file manager application to display "HanGame" and the game folders in the folders pane 350, serves as an interface for generating not only its own object but objects of the other classes and providing the objects to the file manager application.

CHgShellView 440, which is the class for generating the view of the content pane 360 of the file manager application, displays the web page on the content pane 360 with respect to the game folder selected in the folders pane 350.

CHgExtractIcon 450 is the class for controlling icons to be displayed in the folder of the folders pane 350.

CPidlMgr 470 creates, deletes, copies, and manages a pointer to item identifier list (PIDL). The PIDL is an identifier to identify items including the folders in the file manager application. This class is included to CHgShellFolder 430 and CHgEnumIDList 460 as their object.

CHgEnumIDList 460 enumerates every item, that is, every game folder in the "HanGame" folder based on the PIDL, adds them to the list of the total PILD, and returns it to the file manager application.

CMWebControl 480, which is the implementation of IWebBrowser2 being the interface used to control the Internet Explorer, enables to display the "HanGame" site and the game pages in the content pane 360 of the file manager application like the Internet Explorer. This class is included to CHgShellView 440 as its object.

CHgExplorerModule 490 is the main module for managing the entire project written with the ATL. CHgExplorerModule 490 implements various operations required for the COM implementation, and is automatically created.

CRegUtil 492, which is the utility class containing functions to access to the registry 420, can search the game program installed in the user terminal 200 by accessing the registry 240.

CStringUtil 494 is the utility class containing functions to manage strings.

So far, it has been described that "HanGame" and the related games are displayed as folders in the file manager application running in the Microsoft Windows® operating system. Note that the present invention is application to programs which provide the same function as the file manager application, that is, which provide the graphic user interface (GUI) and display folders and files even when it is executed in non-Windows operating systems such as IBM OS/2, Apple's Mac OS, Unix, or Linux.

The present invention is not limited to the portal web site "HanGame" but applicable to a search portal web site, a community portal web site, and a general web site. For instance, the window 300 can display the name of the search portal web site as the parent folder and the names of the sub-pages such as dictionary, news, shopping, and book as its subfolders.

The embodiment of the present invention includes a medium readable by a computer and containing program instructions to execute operations realized by various computers. This medium stores the program to execute the game exposing method or the DLL file contained in the game exposing program as explained above. The medium can include the program instruction, the data file, and the data structure alone or in combination. Examples of the medium include a hard disk, magnetic media such as floppy disk and magnetic tape, optical media such as CD and DVD, magneto-optic medium such as flopical disk, and hardware device containing and executing program instructions such as ROM, RAM, and flash memory. Those media can be transmission media such as optical or metal cable and waveguide including subcarriers carrying signals designating the program instruction and the data structure. Examples of the program instruction include machine codes produced by a compiler and high-level language codes executable by the computer using an interpreter.

Although a few embodiments of the present invention have been shown and described, it would be appreciated by those skilled in the art that changes may be made in this embodiment without departing from the principles and spirit of the invention, the scope of which is defined in the claims and their equivalents.

INDUSTRIAL APPLICABILITY

As set forth above, by displaying the game portal web site and the game names as folders in the window which is frequently used at the computer, it is possible to easily access the game portal web site and the game pages and easily execute the corresponding game program while operating in the file manager application. Besides the web page, the advertisement and game related information of the game portal web site are exposed to inform the services provided from the game portal and utilize them for the advertising.

The invention claimed is:

1. A method for generating a graphical index of an online game in a user terminal, the method comprising:
    inspecting at least one registry stored in the user terminal to:
        detect at least one game installed and executable in the user terminal and provided by a game web site, and
        detect information corresponding to stored files other than the at least one game in the user terminal, the stored files corresponding to files stored in the user terminal at the time of the inspection and unassociated with the game web site;
    generating, in response to inspecting the at least one registry:
        a first graphical index to display a folder indicative of the game web site and, under the folder in the first graphical index, at least one identifier corresponding to the at least one game associated with the game web site, the first graphical index indicating a game portal identifier of the game web site detected through the inspection, and
        a second graphical index to display, based on the information, a hierarchy of folders and electronic files respectively stored in the folders associated with the detected information corresponding to stored files;
    generating a window displaying an inspection result of the user terminal based on the inspection; and
    displaying, simultaneously in the window of the user terminal, a folder pane comprising the first graphical index and the second graphical index, and a content pane comprising a presentation associated with a selected one of the folder and the hierarchy of folders, wherein the content pane is different from the folder pane, the content pane being configured to display an inspection result of the user terminal associated with the second graphical index in response to a selection of a folder associated with the second graphical index and displayed in the folder pane, and
    wherein, in response to a selection of one of the at least one identifier corresponding to one of the at least one game, a web page content corresponding to the selected one of the at least one identifier is retrieved from a web server of the one of the at least one game and displayed in the content pane of the window to enable an execution of the one of the at least one game.

2. The method of claim 1, wherein the at least one identifier is at least one subfolder of the folder indicative of the at least one game provided by the game web site.

3. The method of claim 2, wherein a web page of the game web site is displayed in the content pane of the window in response to the folder being selected, and a web page of the game is displayed in the content pane of the window in response to the subfolder being selected, the web page of the game web site displaying a plurality of games provided by the game web site, the web page of the game display game contents of the corresponding game and user-specific game data associated with the corresponding game, and
    wherein the web page content is associated with an execution of the one of the at least one game according to a user input.

4. The method of claim 2, wherein the displaying the first graphical index comprises:
    displaying the subfolder indicative of the game in the folder pane of the window in response to a determination that the game has been installed in the user terminal.

5. The method of claim 1, wherein a web page of the game web site or a web page of the game is displayed in the content pane of the window.

6. The method of claim 2, wherein a web page of the game web site is displayed in the content pane of the window in response to the folder indicative of the game web site being selected, and the game is executed in response to the subfolder indicative of the game being selected.

7. The method of claim 2, wherein the subfolder is deleted from the folder pane of the window in response to a detection that the game is uninstalled from the user terminal.

8. The method of claim 1, further comprising:
    displaying information related to the game web site or the game in the window.

9. The method of claim 1, wherein inspecting the at least one registry to detect information corresponding to files stored in the user terminal is executed by a file manager application of the user terminal.

10. A web site exposing method, comprising:
    inspecting at least one registry stored in a user terminal to:
        detect at least one game installed and executable in the user terminal and provided by a game web site, the at least one game being associated with the game web site, and
        detect information corresponding to stored files other than the at least one game in the user terminal, the stored files corresponding to files stored in the user terminal at the time of the inspection and unassociated with the game web site;
    generating, in response to inspecting the at least one registry:
        a first graphical index comprising a folder indicative of the game web site and a subfolder of the folder indicative of a hypertext link provided from the game web site, the first graphical index indicating a game portal identifier of the game web site detected through the inspection, the hypertext link being associated with one of the at least one game being associated with the game web site, and a second graphical index comprising a hierarchy of folders and electronic files respectively stored in the folders associated with the detected information corresponding to stored files;

generating an inspection result of the user terminal based on the inspection;

displaying, via a file manager application and simultaneously in a window in the user terminal, a folder pane comprising the first graphical index and the second graphical index, and a content pane comprising a presentation associated with a selected one of the folder and the hierarchy of folders, the content pane being configured to display an inspection result of the user terminal associated with the second graphical index in response to a selection of a folder associated with the second graphical index and displayed in the folder pane;

displaying the game web site in the content pane of the window in response to the folder indicative of the game web site being selected, the content pane being different from the folder pane; and displaying a web page corresponding to the hypertext link in the content pane of the window to enable an execution of the one of the at least one game in response to the subfolder of the folder indicative of the hypertext link being selected.

11. One or more computer-readable media having stored thereon a computer program that, when executed by one or more processors, causes the one or more processors to perform:

inspecting at least one registry stored in a user terminal to:
detect at least one game installed and executable in the user terminal and provided by a game web site, the at least one game being associated with the game web site, and detect information corresponding to stored files other than the at least one game in the user terminal, the stored files corresponding to files stored in the user terminal at the time of the inspection and unassociated with the game web site;

generating, in response to inspecting the at least one registry:
a first graphical index comprising a folder indicative of the game web site and a subfolder of the folder indicative of a hypertext link provided from the game web site, the first graphical index indicating a game portal identifier of the game web site detected through the inspection, the hypertext link being associated with one of the at least one game being associated with the game web site, and a second graphical index comprising a hierarchy of folders and electronic files respectively stored in the folders associated with the detected information corresponding to stored files;

generating an inspection result of the user terminal based on the inspection;

displaying, via a file manager application and simultaneously in a window in the user terminal, a folder pane comprising the first graphical index and the second graphical index, and a content pane comprising a presentation associated with a selected one of the folder and the hierarchy of folders, the content pane being configured to display an inspection result of the user terminal associated with the second graphical index in response to a selection of a folder associated with the second graphical index and displayed in the folder pane;

displaying the game web site in the content pane of the window in response to the folder indicative of the game web site being selected, the content pane being different from the folder pane; and displaying a web page corresponding to the hypertext link in the content pane of the window to enable an execution of the one of the at least one game in response to the subfolder of the folder indicative of the hypertext link being selected.

12. A game exposing system, comprising:
a first server comprising one or more storage devices and a processor, the first server being configured to transmit a program to a user terminal to install the program in the user terminal, wherein the program comprises a set of instructions to be stored in a storage medium of the user terminal, said set of instructions to be executed by a processor of the user terminal to cause the user terminal at least to:
inspect a registry stored in the user terminal to detect at least one game installed and executable in the user terminal and provided by a game web site, generate a first graphical index to display a folder indicative of the game web site and, under the folder in the first graphical index, at least one identifier corresponding to the at least one game associated with the game web site, the first graphical index indicating a game portal identifier of the game web site detected through the inspection, display the first graphical index in a folder pane of a window in the user terminal, the folder pane comprising a content pane, and collect information of stored files other than the at least one game in the user terminal and display, based on the collected information, a second graphical index in the folder pane to represent a hierarchy of folders and electronic files respectively stored in the folders associated with the collected information of stored files, the stored files corresponding to files stored in the user terminal at the time of the inspection and unassociated with the game web site, wherein the folder pane and content pane are displayed simultaneously in the window, the content pane comprising a presentation associated with a selected one of the folder and the hierarchy of folders and the content pane being different from the folder pane, the content pane being configured to display an inspection result of the user terminal associated with the second graphical index in response to a selection of a folder associated with the second graphical index and displayed in the folder pane, and wherein, in response to a selection of one of the at least one identifier corresponding to one of the at least one game, a web page content corresponding to the selected one of the at least one identifier is retrieved from a web server of the one of the at least one game and displayed in the content pane of the window to enable an execution of the one of the at least one game.

13. The game exposing system of claim 12, wherein the at least one identifier is at least one subfolder of the folder indicative of a game provided from the game web site.

14. The game exposing system of claim 13, wherein a web page of the game web site is displayed in the content pane of the window in response to the folder being selected, and a web page of the game associated with the game web site is displayed in the content pane of the window in response to the subfolder being selected.

15. The game exposing system of claim 13, further comprising:
   a second server configured to transmit web page information of the game web site to the user terminal to display a web page of the game web site in the window, the web page of the game web site displaying a plurality of games provided by the game web site; and
   a third server configured to communicate with the user terminal to play the game in response to the subfolder being selected.

16. The game exposing system of claim 13, wherein the user terminal is further caused at least to:
   delete the subfolder from the window in response to a determination that the game is uninstalled from the user terminal.

17. The game exposing system of claim 12, wherein the user terminal is further caused at least to:
   determine whether the game has been installed in the user terminal; and
   display the subfolder in the folder pane of the window in response to a determination that the game has been installed in the user terminal.

18. The game exposing system of claim 12, wherein the first graphical index and the second graphical index are displayed in the folder pane of the window, and a web page of the game web site or a web page of the game is displayed in the content pane of the window.

19. The game exposing system of claim 12, wherein a web page of the game web site is displayed in the content pane of the window in response to the folder indicative of the game web site being selected, and the game is executed in response to the subfolder indicative of the game being selected.

20. The game exposing system of claim 12, wherein the user terminal is further caused at least to:
   display information related to the game web site or the game in the window.

* * * * *